(12) United States Patent
Li et al.

(10) Patent No.: US 8,918,375 B2
(45) Date of Patent: Dec. 23, 2014

(54) CONTENT AWARE CHUNKING FOR ACHIEVING AN IMPROVED CHUNK SIZE DISTRIBUTION

(75) Inventors: Jin Li, Bellevue, WA (US); Sudipta Sengupta, Redmond, WA (US); Sanjeev Mehrotra, Kirkland, WA (US); Ran Kalach, Bellevue, WA (US); Paul Adrian Oltean, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/222,198

(22) Filed: Aug. 31, 2011

(65) Prior Publication Data

US 2013/0054544 A1 Feb. 28, 2013

(51) Int. Cl.
*G06F 17/30* (2006.01)
*G06F 3/06* (2006.01)
*G06F 7/00* (2006.01)
*G06F 11/10* (2006.01)

(52) U.S. Cl.
CPC ............... *G06F 7/00* (2013.01); *G06F 3/0674* (2013.01); *G06F 3/0641* (2013.01); *G06F 11/1004* (2013.01); *G06F 3/0608* (2013.01)
USPC ............................................ 707/693; 713/17

(58) Field of Classification Search
USPC ........ 707/693, 737; 711/111; 706/18; 713/17
See application file for complete search history.

(56) References Cited

U.S. PATENT DOCUMENTS

| | | | |
|---|---|---|---|
| 7,784,094 B2* | 8/2010 | Balakrishnan et al. | 726/13 |
| 7,975,071 B2* | 7/2011 | Ramjee et al. | 709/247 |
| 8,001,273 B2* | 8/2011 | Lillibridge | 709/246 |
| 8,028,106 B2* | 9/2011 | Bondurant et al. | 710/68 |
| 8,046,509 B2* | 10/2011 | Bondurant | 710/68 |
| 8,117,343 B2* | 2/2012 | Lillibridge et al. | 709/246 |
| 8,214,517 B2* | 7/2012 | Dubnicki et al. | 709/231 |
| 2005/0283500 A1* | 12/2005 | Eshghi et al. | 707/200 |
| 2007/0011734 A1* | 1/2007 | Balakrishnan et al. | 726/13 |
| 2008/0133561 A1* | 6/2008 | Dubnicki et al. | 707/101 |
| 2009/0013129 A1* | 1/2009 | Bondurant | 711/115 |

(Continued)

OTHER PUBLICATIONS

Kave Eshghi and Hsiu Khuern Tang, "A Framework for Analyzing and Improving Content-Based Chunking Algorithms"; Published Date: Sep. 22, 2005; 11 pages. Available at: http://www.hpl.hp.com/techreports/2005/HPL-2005-30R1.pdf.

(Continued)

*Primary Examiner* — Alicia Lewis
*Assistant Examiner* — Alexandria Bromell
(74) *Attorney, Agent, or Firm* — Dan Choi; David Andrews; Micky Minhas

(57) ABSTRACT

The subject disclosure is directed towards partitioning a file into chunks that satisfy a chunk size restriction, such as maximum and minimum chunk sizes, using a sliding window. For file positions within the chunk size restriction, a signature representative of a window fingerprint is compared with a target pattern, with a chunk boundary candidate identified if matched. Other signatures and patterns are then checked to determine a highest ranking signature (corresponding to a lowest numbered Rule) to associate with that chunk boundary candidate, or set an actual boundary if the highest ranked signature is matched. If the maximum chunk size is reached without matching the highest ranked signature, the chunking mechanism regresses to set the boundary based on the candidate with the next highest ranked signature (if no candidates, the boundary is set at the maximum). Also described is setting chunk boundaries based upon pattern detection (e.g., runs of zeros).

20 Claims, 7 Drawing Sheets

(56) References Cited

U.S. PATENT DOCUMENTS

| | | | |
|---|---|---|---|
| 2009/0013140 A1* | 1/2009 | Bondurant et al. | 711/162 |
| 2009/0187673 A1* | 7/2009 | Ramjee et al. | 709/247 |
| 2009/0300673 A1* | 12/2009 | Bachet et al. | 725/31 |
| 2009/0313248 A1 | 12/2009 | Balachandran | |
| 2010/0094817 A1 | 4/2010 | Ben-Shaul | |
| 2010/0114980 A1* | 5/2010 | Lillibridge et al. | 707/803 |
| 2010/0161608 A1 | 6/2010 | Jain | |
| 2010/0205163 A1* | 8/2010 | Eshghi et al. | 707/698 |
| 2010/0235485 A1* | 9/2010 | Lillibridge | 709/223 |
| 2010/0246709 A1* | 9/2010 | Lillibridge et al. | 375/295 |
| 2011/0225385 A1* | 9/2011 | Tofano | 711/170 |
| 2011/0307447 A1* | 12/2011 | Sabaa et al. | 707/637 |
| 2011/0307659 A1* | 12/2011 | Hans et al. | 711/114 |
| 2012/0036319 A1* | 2/2012 | Bondurant | 711/111 |
| 2012/0079198 A1* | 3/2012 | Bondurant et al. | 711/115 |
| 2012/0102009 A1* | 4/2012 | Peterson et al. | 707/705 |
| 2012/0185448 A1* | 7/2012 | Mensch et al. | 707/693 |
| 2012/0198089 A1* | 8/2012 | Dhruv et al. | 709/231 |

OTHER PUBLICATIONS

Ravindra, M.; "Effective Data Deduplication Implementation"; Retrieved Date: Jul. 19, 2011; 11 pages. Available at: http://www.tcs.com/SiteCollectionDocuments/White%20PapersHiTech_Whitepaper_Effective_Data_Deduplication_Implementation_05_2011.pdf.

Jaehong Min, et al.; "Efficient Deduplication Techniques for Modern Backup Operation", IEEE Transactions on Computers, vol. 60, No. 6; Published Date: Dec. 7, 2010; 17 pages. Available at: http://ieeexplore.ieee.org/stamp/stamp.jsp?tp=&arnumber=5669285.

Biplob Debnath, et al.; "ChunkStash: Speeding up Inline Storage Deduplication using Flash Memory", Retrieved Date: Jul. 19, 2011; 15 pages. Available at: http://www.usenix.org/event/atc10/tech/full_papers/Debnath.

* cited by examiner

CONTENT AWARE CHUNKING FOR ACHIEVING AN IMPROVED CHUNK SIZE DISTRIBUTION

BACKGROUND

Data deduplication (sometimes referred to as data optimization) refers to detecting, uniquely identifying and eliminating redundant data in storage systems and thereby reducing the physical amount of bytes of data that need to be stored on disk or transmitted across a network, without compromising the fidelity or integrity of the original data. By reducing the resources needed to store and/or transmit data, data deduplication thus leads to savings in hardware and power costs (for storage), data management costs (e.g., reducing backup costs) and network bandwidth costs. As the amount of digitally stored data grows, these cost savings become significant.

There are a variety of techniques and granularity levels for eliminating redundancy within and between persistently stored files. Fixed-size chunking, in which a fixed size block or chunk of a file is deduplicated, is an improvement over file-level chunking in which an entire file is treated as a chunk. However, fixed-size chunking fails to handle certain conditions, such as an insertion or deletion of data at the beginning or in the middle of a file, in terms of being able to detect unchanged portions of the data after the insertion or deletion edits (due to a data shifting effect). Variable-size chunking addresses these failures, but at the cost of additional processing. Most variable size chunking techniques employ content aware chunking, which is a useful feature of many high efficiency storage and communication protocols.

It is highly desirable that any system implementing content aware chunking achieves extremely high throughput (e.g., capable to process one or more Gbps per CPU core, and ten or more Gbps via hardware assistance) as well as a desired chunk size distribution. Further, having very small chunks and very large chunks are undesirable. Very small chunks result in lower deduplication savings leading to high overhead during indexing and/or communicating. Very large chunks may exceed the allowed unit cache/memory size, which leads to implementation difficulties. Having very large chunks also make it more difficult to find matching chunks and may also result in reduced deduplication savings. Moreover, it is desirable to have a smooth probability distribution of chunk sizes to optimize savings while maintaining low processing complexity.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed to content aware chunking for achieving an improved chunk size distribution and likely improved deduplication savings. In one aspect, a chunking mechanism partitions a file into chunks that satisfy one or more chunk size restrictions, such as a minimum chunk size and/or a maximum chunk size. To identify chunk boundaries, the chunking mechanism applies a fingerprint analysis on a file data. In one aspect, if a fingerprint matches a target pattern, then a file position associated with the fingerprint is selected as a chunk boundary.

Instead of comparing an entire fingerprint, the chunking technology may use signatures that are portions of the fingerprint and range in size between a minimum signature size and a maximum signature size. In one aspect, the minimum signature size and the maximum signature size are established as probabilistic thresholds for determining the chunk boundary. Using smaller signature sizes in general results in smaller chunk sizes. Selecting a file position that is associated with matching signature between the minimum chunk size and the maximum chunk size is very likely to be a better chunk boundary than using only the maximum chunk size.

In another aspect, chunk boundaries are selected that encapsulate a known bit pattern. As the sliding window moves across file positions, the chunking mechanism compares a signature with a target pattern. If matched, a core loop is exited to find other signature matches, to set an actual boundary if the highest ranking (best possible) signature is matched, or set a candidate chunk boundary based upon a lesser match, e.g., the next best that matched. Core loop processing continues for the chunk until an actual boundary is detected or an end condition is detected. If the end condition corresponds to the maximum size restriction, the chunk mechanism regresses to find the candidate chunk boundary within the chunk size restriction that has the highest ranking among the candidates, and selects that candidate to set the actual boundary for the chunk.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
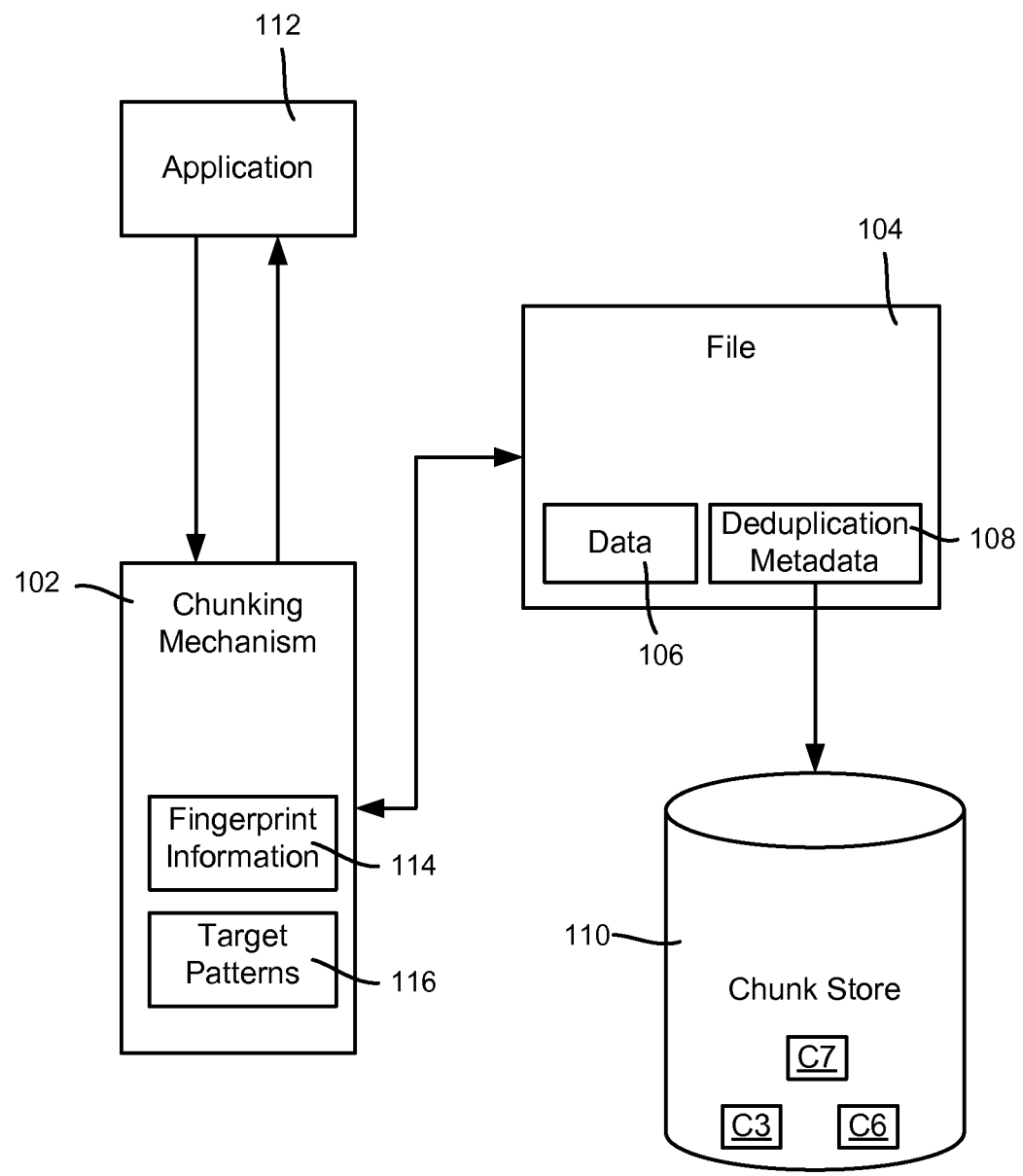
FIG. 1 is a block diagram illustrating an exemplary system for partitioning a file into chunks that satisfy at least one chunk size restriction according to one example implementation.

Various aspects of the technology described herein are generally directed towards content aware chunking for achieving an improved chunk size distribution when partitioning files into chunks. Content aware chunking as described herein is implemented by a chunking mechanism that computes fingerprints for each file position that satisfies one or more chunk size restrictions, such as a minimum chunk size and/or a maximum chunk size, which ensures that the chunks are not too small or too large.

A fingerprint may comprise a hash value (e.g., a 64-bit CRC) based on a sliding window within the file. In one exemplary implementation, the chunking mechanism compares the fingerprint with target patterns of various rankings. In another exemplary implementation, the chunking mechanism compares the target patterns with signatures having a size between a minimum signature size and a maximum signature size. After comparing various portions of the fingerprint with the target patterns, the window moves by a number of bits (e.g., a byte) to another file position between the minimum chunk size and the maximum chunk size. A chunk boundary is selected if a distance between a previous chunk boundary and the file position is at least the minimum chunk size and if the fingerprint signature matches a given (e.g., highest ranking) target pattern or if the distance between the file position and the previous chunk boundary is the maximum chunk size. The portion of the file between two successive chunk boundaries is the chunk.

Identifying a matching fingerprint indicates a very high likelihood that an associated file position is an appropriate chunk boundary. However, if such a matching fingerprint does not exist when the maximum chunk size is reached, a file position having a highest matching signature size amongst other file positions between the minimum chunk size and/or the maximum chunk size is also an appropriate chunk boundary. In either instance, the file position indicates a chunk that is likely to be previously deduplicated and stored within a chunk store.

To enforce the minimum chunk size constraint, whenever a chunk boundary has been declared, the next chunk boundary is not evaluated until at least min_size bytes has been passed. After a chunk boundary has been declared, if another chunk boundary is not determined until max_size bytes, a chunk boundary may be forcefully declared. Such a basic algorithm can be very efficiently implemented in that the signature need not be evaluated for the first min_size bytes after a chunk boundary, and thus is even more efficiently evaluated compared with such an algorithm without a chunk size constraint. However, such a basic algorithm results in an unsatisfactory large percentage of chunks with chunk size equal to max_size. Because the max_size rule is forcefully enforced, the boundaries of these chunks are not dependent upon local file content, which results in poor boundary alignment and poor deduplication performance if content in those chunks are changed.

Described herein is a regression chunking algorithm that allows the enforcement of max_size rule while providing an improved chunk size distribution. That is, whenever the max_size constraint is reached, instead of forcefully declared a boundary, a set of more matching values are invoked to attempt to find a chunk boundary that is within (min_size, max_size) and still dependent on the local content. More particularly, regression chunking uses a set of nesting matching rules for the declaration of chunk boundaries:

Rule 1. $fp_i \bmod n \in S_1$
Rule 2. $fp_i \bmod n \in S_2$
. . .
Rule k. $fp_i \bmod n \in S_k$,
With $S_1 \subset S_2 \subset \ldots \subset S_k$.

where $fp_i$ represents the fingerprint at position i, and $S_1$-$S_k$ represent the signature patterns.

Often, the regression chunking algorithm uses only Rule 1, and only declares a chunk boundary if the signature (Rolling CRC) matches in set $S_1$. However, if after max_size bytes has passed, and the chunking algorithm has not yet found a position (location) that satisfies Rule 1, Rule 2 is used in regression, in which the last rolling CRC match in $S_2$ between (min_size, max_size) after a chunk boundary is declared the chunk boundary. If a rolling CRC match in $S_2$ still is not found, Rule 3 is used in regression, in which the last Rolling CRC match in $S_3$ between (min_size, max_size) after a chunk boundary is declared the chunk boundary, and so on if necessary up until Rule k. Only after Rule k has been applied, and no rolling CRC match in $S_k$ between (min_size, max_size) is found, is the chunk boundary forcefully declared at max_size. The regression chunking algorithm enables the max_size chunking rule to be satisfied in a content dependent fashion through gradually regression to a larger Rolling CRC match set.

For efficient implementation, the set $S_1 \subset S_2 \subset \ldots \subset S_k$ can be further designed in such a way that multiple rolling CRC values in the larger set can be checked with one operation. For example, a specific method of implementing regression chunking sets a matching mask value mask, and a full match length of L bits. Each rolling CRC matching rule may be enforced as follows:

Rule 1. Last L bits of $fp_i$ and mask matches.
Rule 2. Last L−1 bits of $fp_i$ and mask (last L−1 bits of the mask) matches.
. . .
Rule k. Last L−k bits of $fp_i$ and mask matches.

Note that it is straightforward to change the above algorithm to match the first L . . . L−k bits of Rolling CRC, or any L . . . L−k bits of Rolling CRC, as long as the matching bits in the lower level rule is nested in the matching bits in the higher level rule.

The nesting matching bits lead to efficient implementation of the regression algorithm. In general, the core loop of the Rolling CRC calculation is done very efficiently, with only two lookup operations and two XORs operations. The throughput of the chunking module is significantly affected when the core loop is exited, and thus this cannot be done too often to remain efficient. By using regression chunking with nesting matching bits, only Rule k need be evaluated in the core loop of Rolling CRC calculation, allowing the regression chunking to enjoy a throughput matches that of traditional basic chunking. Only when rule k is satisfied, does the process break out of the core loop of Rolling CRC matching, and further evaluate whether Rule k−1, Rule k−2, . . . , Rule 1 is satisfied.

An added advantage of the nesting matching bits based regression chunking is to allow the algorithm to process the data only once, without ever needing to check the data that has already been processed. More particularly, let $p_i$ denote the last position that regression Rule i has been satisfied. An unlikely small constant init, e.g., init=−1, is used for $p_i$ if Rule i has not been satisfied yet. Because the satisfaction of Rule i means that all Rules j with j≥i have to be satisfied, there is:

$$p_1 \leq p_2 \leq \ldots \leq p_k$$

During the execution of the regression chunking algorithm, the core loop of Rolling CRC matching, which only checks Rule k is met and whether the end of the current data chunk, or end of data file, or max_size has reached. Note that the three end conditions are directed towards how far the core loop scans the data, and these condition thus may be merged into one single end condition for the core loop. Once a match is found, the process further checks Rule k−1, Rule k−2, . . . , Rule 1, and sets the chunk boundary $p_i$ according to which Rule has been satisfied. If Rule 1 has been satisfied, a chunk boundary is declared immediately. If max_size has reached, and no match of Rule 1 has been found, the process checks if $p_2$ has been set. If the answer is positive, $p_2$ contains regressed chunk boundary of Rule 2, and a chunk boundary can be declared at $p_2$. Then, $p_i$ may be updated as follows:

$$p_i = \begin{cases} p_i & p_i - p_2 \geq \text{min\_size} \\ \text{init} & \text{otherwise} \end{cases}$$

As can be understood, as long as the distance between $p_i$ and $p_2$ is larger than min_size, $p_i$ remains a valid regression position for Rule i for scanning forward. After all $p_i$ have been updated, the scanning may commence from the current position. The process does not need to back scan data, as the matching of Rule 1 . . . k has already been checked. This allows the regression chunking to performed very efficiently, and with only a single forward scan of the data.

By way of example, consider that the number of matching bits is L=16 (target chunk size is 64K), and min_size=32 KB, and max_size=128 KB. Without regression chunking, if may be observed that there is about a fourteen percent (14%) chance that a chunk with max_size will be declared. With one level of regression, this probability reduces to 1.8%. With two levels of regression, the probability that a chunk with max_size is declared reduce to $3 \times 10^{-4}$. With three and four levels of regression, the probability further reduces to $10^{-7}$ and $10^{-14}$, respectively.

Turning to another aspect, in storage and communication applications that utilize chunking, it is frequently the situation that the file to be chunked contains a large region of repeated patterns of arbitrary values of N bits, such as a large number of zeros. For purposes of explanation, zeros will be generally described herein, but it is understood that the technology applies to any such patterns. Using zeros as the example, transition boundary between non-zero regions and regions with large chunks of continuous zeros frequently marks the boundary between data and non-data (zero-filling). If the chunk boundary can be co-located with such a transition boundary, it may significantly improve the subsequent deduplication application performance.

Described herein is a high throughput chunking algorithm that can detect transitions into and out of large regions of patterns of arbitrary values such as continuous zeros, and declare a chunk boundary at the point of transition. The chunk size distribution rule may also be enforced such that the chunk is between min_size and max_size. The algorithm includes two parts, comprising the detection of a transition into pattern (e.g., zero) regions, and the counting of runs of zeros or the like (thus, transition out of large continuous zero regions). The algorithm may be combined with regression chunking or basic chunking.

As described above, the core loop of the Rolling CRC matching may be very efficiently implemented. For pattern transition detection, a general goal is thus to add the logic to detect a transition (e.g., into large regions of continuous zeros) without significantly slowing down the core loop. To achieve that, the process checks if the Rolling CRC $fp_i$ is zero (or the other pattern) in the core loop. For example, because Rolling CRC is a type of CRC, a continuous w Bytes of zeroes will lead to a zero Rolling CRC value. Once outside of the core loop, the process then back checks w windows of bytes to see if all of them are zeros. Because Rolling CRC keeps a rolling window of w bytes, these data are already available during the execution of core loop of the Rolling CRC matching. This implementation only adds a comparison to zero (or other pattern value) in the core loop of Rolling CRC matching for detection of transition into zero regions.

For example, Let $p_{zero}$ be the position that transits from non-zero to zero regions. Once transitions into zero regions are detected, the process then counts runs of zeros from $p_{zero}$. If the run of zeros is larger than the min_size, a chunk boundary is declared at $p_{zero}$, which marks the boundary of transition from non-zero regions to large chunk of zeros. The regression Rule i position $p_i$ is initialized to init, and the algorithms continuous with counting runs of zeros.

If the runs of zeros is smaller than min_size, the continuous zero region is not long enough, whereby a normal scan of the core loop of the Rolling CRC matching will be resumed. Note that in the regions of runs of zeros, the Rolling CRC will take a value of zero, and thus none of the matching Rule 1 . . . k will be triggered. Thus, there is no need to rescan the data. If the counting of runs of zeros causes the current data position to be larger than max_size, the regression chunking rule described above may be invoked. This is because for the entire max_size chunk, the matching Rule 1 has not been triggered.

Whenever a new chunk boundary is declared, the process checks if there is a continuous run of zeros (or the other pattern) from the chunk boundaries. If the continuous run of zeros (or the other pattern) from the last chunk boundary is larger than min_size, the process continues the counting of runs of zeros (or runs of the other pattern). Whenever a first non-zero byte (or a first byte that deviates from the other pattern) is detected, a chunk boundary is declared as it marks the transition from a large region of continuous zeros to a non-zero region (or transition outside the other pattern). If the continuous run of zeros from the chunk boundary is smaller than min_size, the process skips forward to min_size position and starts the core loop of Rolling CRC matching.

The algorithm may be executed by scanning the entire dataset only once, as it only need to keep two variables, $p_{zero}$, which is the position that transits into zero region, and the current run of zeros.

Turning to the drawings, FIG. 1 is a block diagram illustrating an exemplary system for partitioning a file into chunks that satisfy at least one chunk size restriction according to one example implementation. The exemplary system includes various example components, such as a chunking mechanism 102, implemented in hardware and/or software. The exemplary system executes the chunking mechanism 102 in order to partition a file 104 into one or more chunks by determining appropriate chunk boundaries as described herein. In general, when data 106 is fully deduplicated, the file 104 is associated with metadata including deduplication metadata 108 that maps the chunks (e.g., C3, C6 and C7) in a chunk store 110 back to a logical representation of the file 104.

According to one exemplary implementation, the chunking mechanism 102 implements a content-aware chunk boundary determination process for the file, such as after a modification of existing data or addition of new data by an application 112. The chunking mechanism 102 uses fingerprint information 114 to determine if data within a certain portion of the file 104 forms an suitable chunk. Each signature in the fingerprint information 114 includes a portion of a fingerprint.

As described herein, target patterns 116 are used to determine when a signature indicates a candidate (or actual) chunk boundary that defines a chunk end. The target patterns 116 may comprise a hierarchy of bit patterns in which each level is ranked according to its probability to determine a "better" chunk boundary. In one exemplary implementation, the signatures are compared with a highest ranking target pattern of the target patterns 116. If no matching target pattern is identified, the signatures are compared with lower ranking ones of the target patterns 116 to select a file position associated with a highest ranking matching target pattern.

Figure 2:
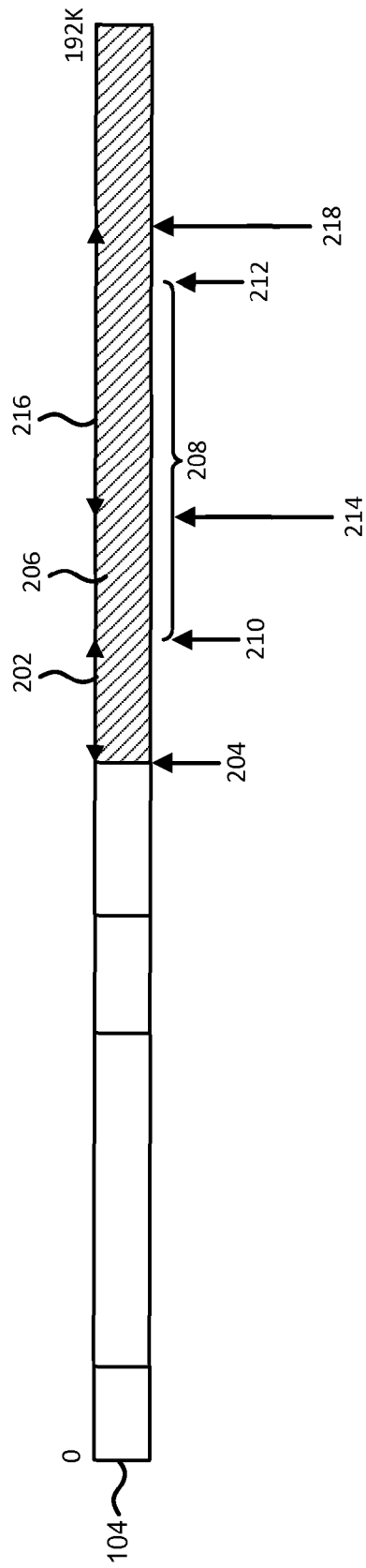
FIG. 2 represents a file being chunked using a sliding window according to one example implementation.

FIG. 2 represents a file 104 being deduplicated using a sliding window 202 according to one example implementation. FIG. 2 depicts a minimum and a maximum chunk size that form a range 208 within the new data 206 according to one exemplary implementation. Because of these chunk size restrictions, the chunking mechanism 102 declares a chunk boundary at a file position within the range 208 that satisfies the constraints.

In one exemplary implementation, the chunking mechanism 102 commences evaluating the signature of a window of the new data 206 starting at a file position 210, which represents the minimum chunk size. The chunking mechanism 102 computes a fingerprint of the sliding window 202 encompassing a portion of the new data before the file position 210. The chunking mechanism 102 may generate a series of signatures in which each signature represents a different sized portion of the fingerprint. For example, a signature may comprise a number of bits at an end, a beginning or middle of the fingerprint.

In one exemplary implementation, in a core loop described above and with reference to FIG. 3, the chunking mechanism 102 compares a signature of the window having the minimum signature size with a corresponding portion of at least one target pattern. If the signature matches the portion of the at least one target pattern, the chunking mechanism 102 exits the core loop and attempts to find the best matching target pattern for signatures of the current window fingerprint, e.g., using signatures and target patterns having other sizes.

Figure 3:
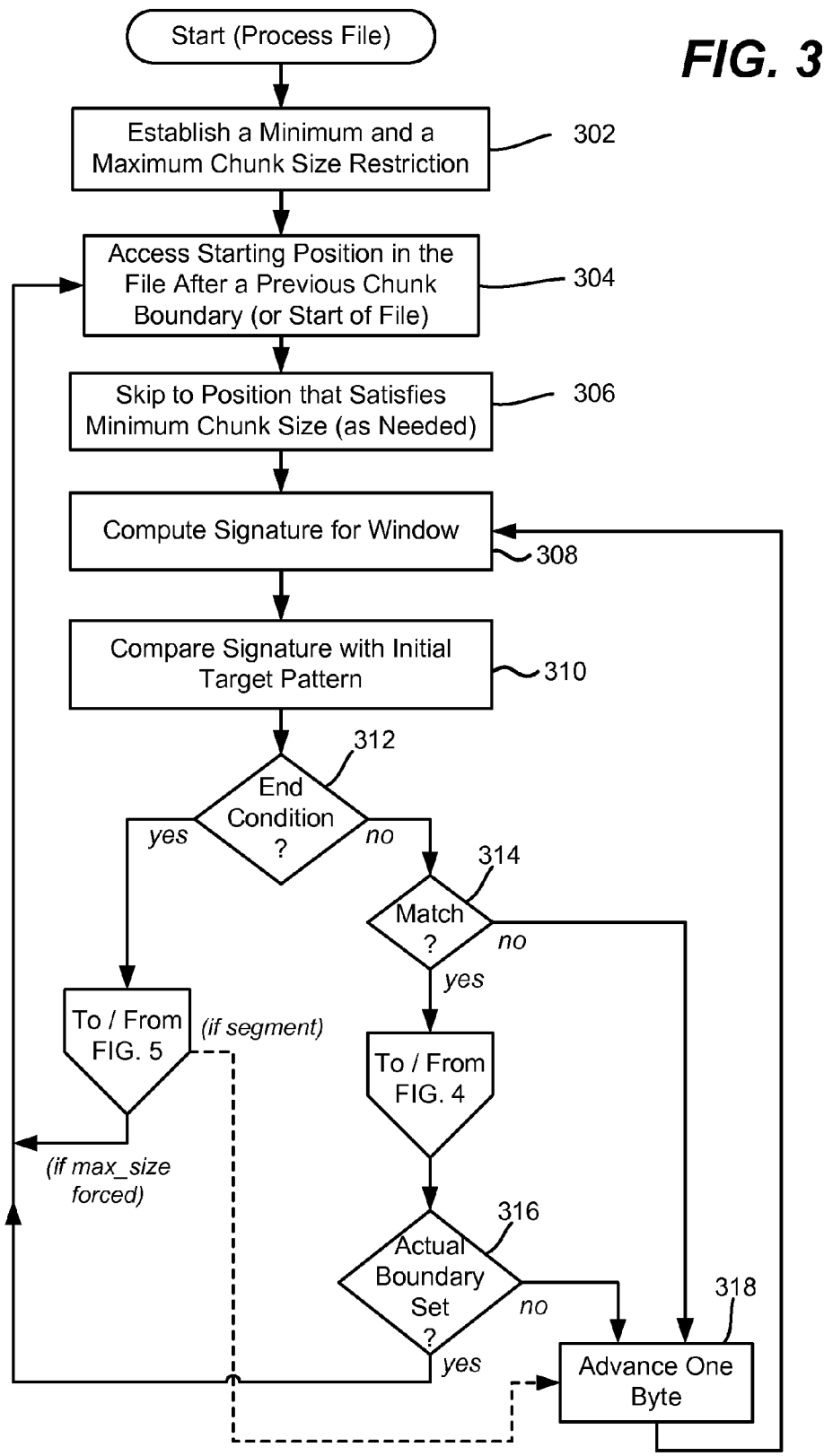
FIG. 3 is a flow diagram illustrating exemplary steps for partitioning a file into chunks that satisfy at least one chunk size restriction according to one example implementation.

FIG. 3 is a flow diagram illustrating exemplary steps, including the core loop, for partitioning a file into chunks that satisfy at least one chunk size restriction according to one example implementation. Step 302 is directed to establishing chunk size restrictions, such as a minimum chunk size restriction and a maximum chunk size restriction.

Step 304 represents moving the chunking algorithm to the start of the chunk, e.g., following that last chunk (or the start of the file when first stating chunking). Step 306 represents skipping ahead (if needed) to a position in the file where at least the minimum chunk size is satisfied, as there is no reason to evaluate a window that is smaller than the chunk minimum size.

Steps 308, 310, 312, 314 and 318 represent the core loop. In general, the core loop computes the signature for the window, and step 310 compares the signature to an initial target pattern. If not an end condition (step 312) or a match (step 314), the window slides forward (e.g., one byte) as represented by step 318.

As can be seen and as described above, the core loop is very efficient. Only in the event that an end condition is reached (described below with reference to FIG. 5), or a match is determined at step 318, is the core loop exited. As described above, the core loop may be modified in one alternative implementation to also perform pattern checking, e.g., runs of zeros.

Figure 4:
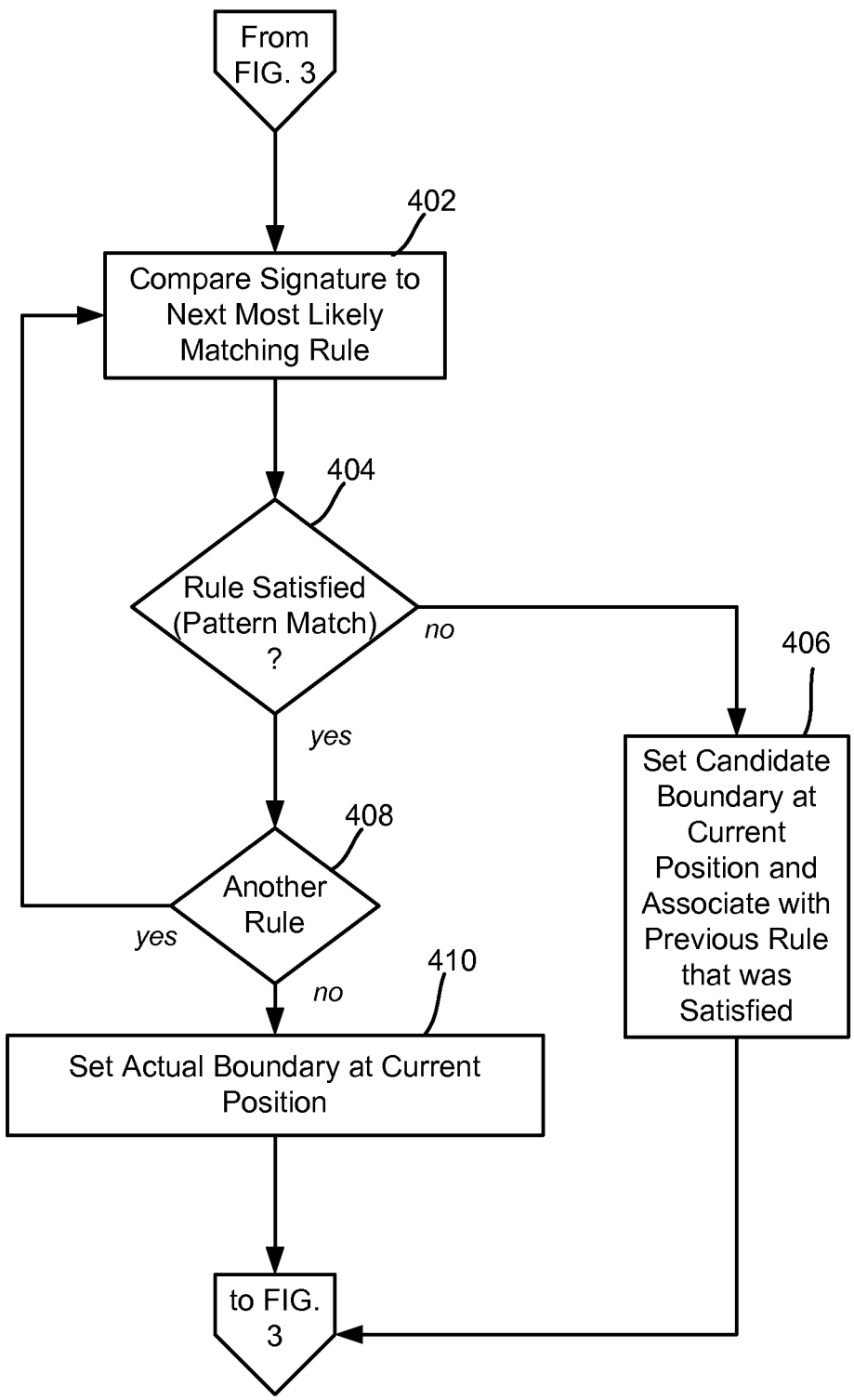
FIG. 4 is a flow diagram illustrating exemplary steps for matching other signatures and patterns once an initial match is determined.

In general, the match at step 314 is of a signature and a target pattern that represent a basic match. FIG. 4 represents exiting the core loop to determine whether a better match with another target pattern may be identified, in which each better match corresponds to a better choice for the chunk boundary.

The check for a better match may be performed in any Rule order, however it has been found most efficient to check in the order of rule k to rule 1 (because of probability of matching). Thus, for efficiency, FIG. 4 shows an implementation that at step 402 checks the next highest numbered Rule first (Rule k−1, because rule k was already checked when exiting the loop). If this Rule is not met (step 404), then Rule k was the previous Rule that was satisfied, and thus a candidate boundary is set at step 406, which represents maintaining candidate boundary data corresponding to the position and the associated rule (Rule k) that was last matched previous to the latest evaluation. The process then returns to step 316, which because a candidate boundary (rather than an actual) boundary was set, slides the window via step 318 and returns to the core loop.

If matched at step 404, then a next most likely matching Rule, Rule k−2 following the above example, is compared at step 402; if not matched at step 404, Rule k−1 was the last satisfied Rule, and thus the candidate is associated with Rule k−1 at step 406.

As can be readily appreciated, eventually a Rule will not be satisfied at step 404, or the last Rule, Rule 1, will be satisfied and there are no more Rules to evaluate. Step 408 detects the condition where Rule 1 was satisfied and thus there are no more Rules to evaluate. In this situation, an actual (non-candidate) boundary is immediately declared and set (step 410) as described above, that is, the chunk is determined. This condition is represented as being evaluated at step 316 of FIG. 3.

Figure 5:
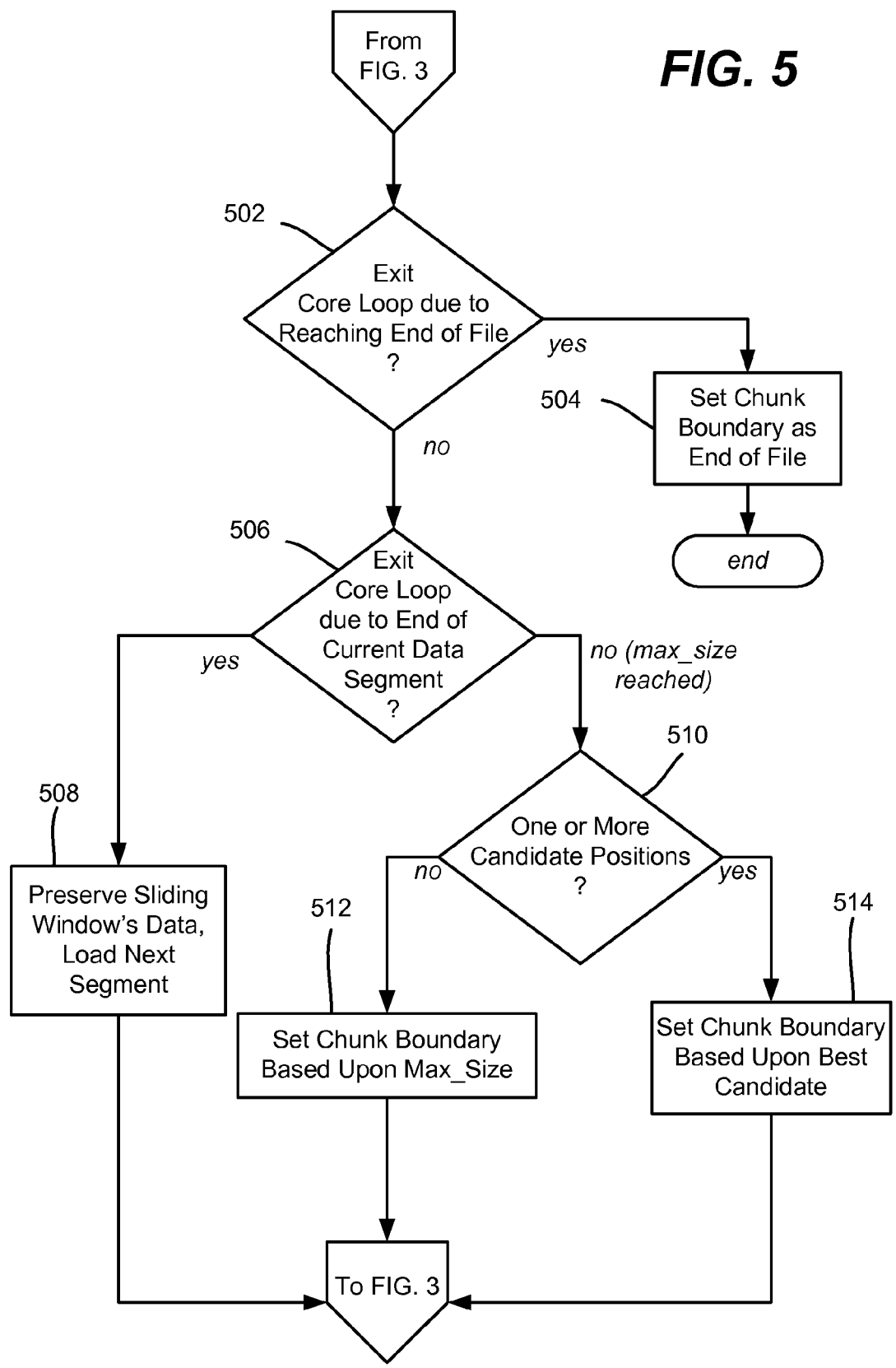
FIG. 5 is a flow diagram illustrating exemplary steps for handling detected end conditions when chunking a file.

FIG. 5 represents example steps for handling of the end conditions, which may occur in a different order from those depicted. At step 502, the end of a file is evaluated. If the file is at an end, the chunk boundary is set to the file end at step 504.

If the end of a current data segment (a subset of the file, typically when the file is large) is detected as represented by step 506, a sliding window's worth of data is preserved, and the next segment loaded for continued processing (step 508).

If not the file or segment end, then the other condition is the max_size constraint having been reached. Step 510 evaluates whether there are any candidate positions where a candidate boundary was saved. If not, the boundary is forced to meet the maximum chunk size constraint at step 512. Otherwise, the best candidate is chosen for the boundary as represented via step 514. As can be seen, regressing to find the best candidate that satisfies the maximum and minimum chunk size constraints obtains a generally better chunk boundary than forcing the boundary at the maximum size constraint, which is done only if no candidates were found via matching.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
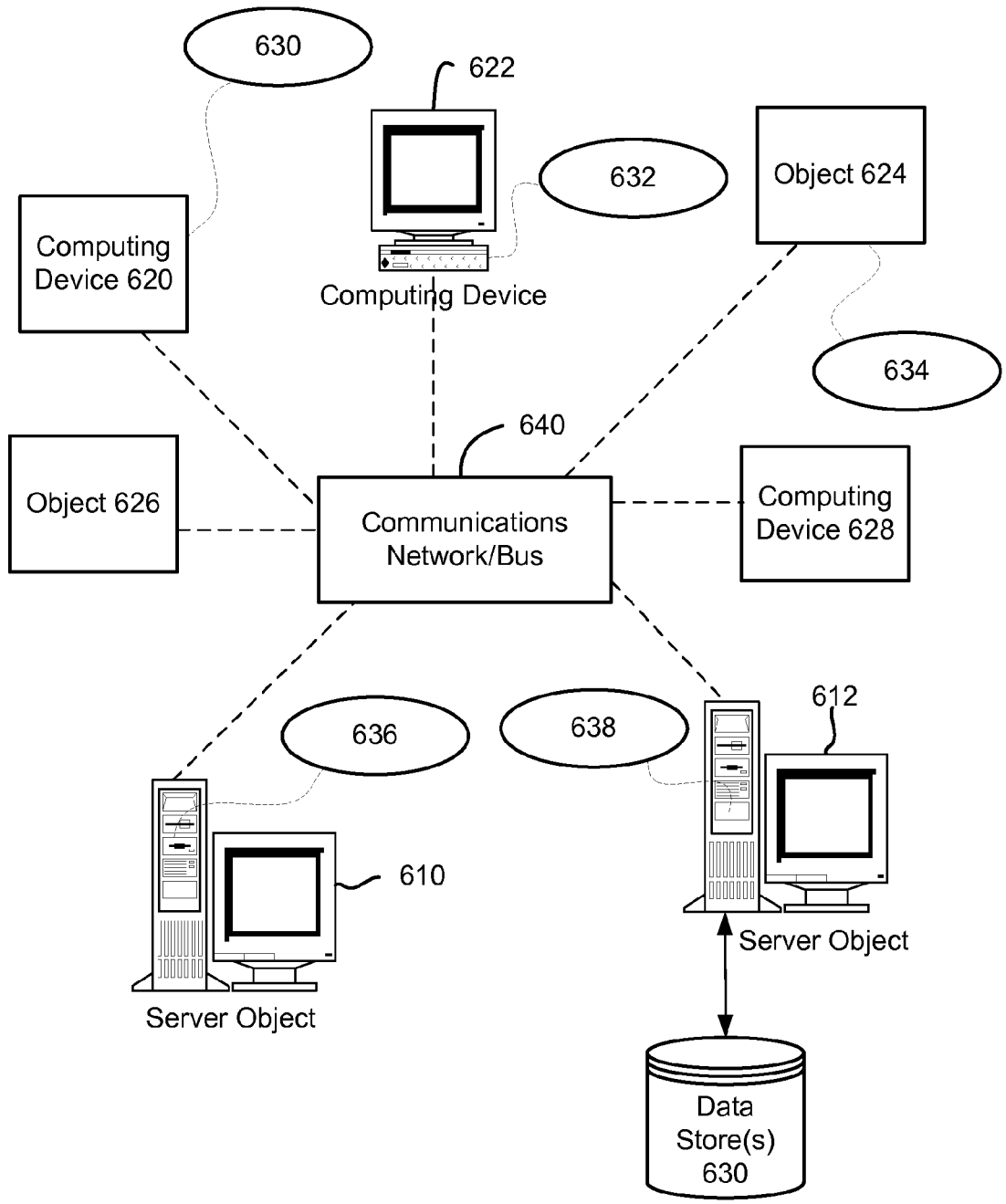
FIG. 6 is a block diagram representing exemplary non-limiting networked environments in which various embodiments described herein can be implemented.

FIG. 6 provides a schematic diagram of an exemplary networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
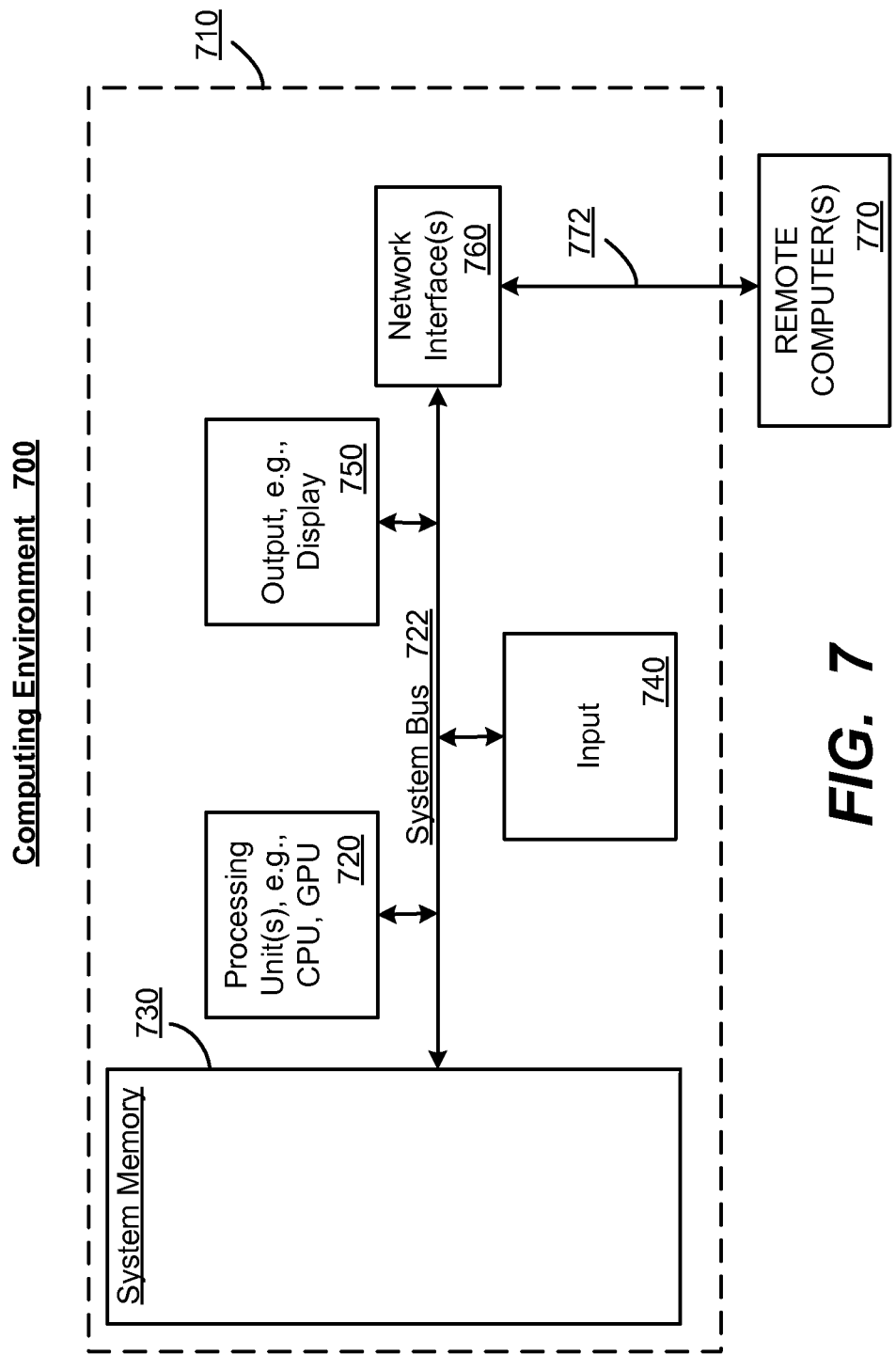
FIG. 7 is a block diagram representing an exemplary non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the exemplary computing system environment 700.

With reference to FIG. 7, an exemplary remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor or hardware, or both, comprising, partitioning a file into chunks that satisfy at least one chunk size restriction, including, establishing a minimum chunk size and a maximum chunk size for performing a chunk boundary determination, and for at least each file position that is within the chunk size restriction, determining an actual chunk boundary by comparing a signature that is representative of a rolling window corresponding to that position to an initial target pattern, and in response to the initial target pattern being matched, identifying a chunk boundary candidate or the actual chunk boundary based upon one or more other signature and target pattern comparisons, and in response to the actual chunk boundary not being set, the maximum chunk size is reached and at least one candidate chunk boundary exists at a position that satisfies the chunk size restriction, setting the actual chunk boundary by selecting a selected chunk boundary candidate and setting the selected chunk boundary candidate as the actual chunk boundary based upon a signature ranking associated with each candidate.

2. The method of claim 1, further comprising setting the actual chunk boundary based upon the maximum chunk size restriction if no candidate chunk boundary exists.

3. The method of claim 1, wherein comparing the signature with the initial target pattern comprises matching the signature with a target pattern under a bitmask of specific length.

4. The method of claim 1 wherein the selected chunk boundary is based upon a candidate chunk boundary associated with a best matching signature, and wherein identifying a chunk boundary candidate or the actual chunk boundary based upon one or more other signature and target pattern comparisons comprises expanding the matching of the initial signature to a set of one or more signatures and other target patterns to attempt to associate the chunk boundary candidate with its highest matching signature size.

5. The method of claim 4, wherein expanding the matching of the signature comprises matching the signature to one or more other target patterns under a bitmask of a reduced length relative to a previously matched bitmask length.

6. The method of claim 1, where the signature comprises a certain number of bits determined from a sliding hash or CRC computation.

7. The method of claim 1, wherein comparing the signature further comprises, for each position of the file within the chunk size restriction, examining an associated fingerprint to identify a transition into a predetermined bit pattern, and setting the actual chunk boundary within the chunk size restriction based upon a presence of the predetermined bit pattern.

8. The method of claim 7 wherein the predetermined bit pattern comprises a plurality of consecutive zeros.

9. The method of claim 1 further comprising identifying a file position that is a transition into or out of out of a predetermined bit pattern, and if the file position satisfies the chunk size restriction, establishing the actual chunk boundary at the file position.

10. The method of claim 9 wherein the predetermined bit pattern comprises a run of zeros.

11. A system, comprising, at least one processor, a memory communicatively coupled to the at least one processor and including components comprising, a chunking mechanism configured to partition a file into chunks that satisfy a minimum chunk size and a maximum chunk size for performing chunk boundary determination, wherein the chunking mechanism is further configured to process file data from a chunk starting point, for at least each position of the file from the chunk starting point that is within the chunk size restriction, process a rolling window to compare an initial signature representative of window data with an initial target pattern to identify one or more chunk boundary candidates within the chunk size restriction, and when the maximum chunk size is reached, to rank each chunk boundary candidate according to target pattern matching rules and to select a chunk boundary candidate as an actual chunk boundary.

12. The system of claim 11, wherein the chunking mechanism restarts the chunk boundary determination at an unexamined portion of the file after the actual chunk boundary has been determined.

13. The system of claim 11, wherein the chunking mechanism is further configured to set a chunk boundary based upon detection of a known bit pattern.

14. The system of claim 13 wherein the known bit pattern comprises a continuous run of zero bits.

15. The system of claim 11, wherein a plurality of chunk boundary candidates exist within the chunk size restriction, and wherein the chunking mechanism regresses to select a chunk boundary candidate as an actual chunk boundary based upon a signature ranking associated with each chunk boundary candidate.

16. The system of claim 15 wherein the chunking mechanism is further configured to determine the signature ranking associated with each chunk boundary candidate by comparing at least one other signature representative of the window data with an initial target pattern when the initial signature matches the initial target pattern.

17. One or more computing devices having executable instructions, which when executed perform steps, comprising:
   processing a rolling window of data to set a chunk boundary relative to a starting chunk position, in which a size of the chunk is constrained by a minimum and maximum chunk size restriction, the processing of the rolling window including:
   (a) comparing an initial signature associated with a corresponding fingerprint of the window data with an initial target pattern;
   (b) advancing the window and returning to step (a) until a maximum chunk size constraint is detected or a match of the initial signature with an initial target pattern is detected;
   (c) in response to a match being detected, comparing other signatures with other, corresponding target patterns to determine whether to set an actual chunk boundary or a candidate chunk boundary, and if an actual boundary is to be set, setting the actual boundary and advancing to step (e), and if a candidate chunk boundary is to be set, setting the candidate chunk boundary at a file position corresponding to the rolling window, including associating the candidate chunk boundary with a signature ranking based upon which other signature matched which other target pattern, advancing the window and returning to step (a);
   (d) in response to the maximum chunk size constraint being detected and at least one candidate chunk boundary exists, selecting a candidate chunk boundary as the actual chunk boundary, including selecting based upon the signature ranking when two or more candidate chunk boundaries exist; and (e) ending processing of the rolling window.

18. The one or more computing devices of claim 17 wherein the maximum chunk size constraint is detected and no candidate chunk boundary exists, and having further executable instructions comprising, setting the actual chunk boundary based upon the maximum chunk size.

19. The one or more computing devices of claim 17 having further executable instructions comprising, determining as part of step (c) whether an actual chunk boundary is to be set based upon whether a particular other signature matches a particular other target pattern.

20. The one or more computing devices of claim 17 wherein the processing of the rolling window includes, before performing step (a), skipping to a file position in which the minimum size constraint is met.

* * * * *